(12) United States Patent
Shaw et al.

(10) Patent No.: US 9,047,622 B1
(45) Date of Patent: *Jun. 2, 2015

(54) DELIVERING CONTENT TO USERS BASED ON ADVERTISEMENT INTERACTION TYPE

(75) Inventors: Satyam Shaw, Sunnyvale, CA (US); Ravi Jain, Palo Alto, CA (US); Surojit Chatterjee, Fremont, CA (US)

(73) Assignee: GOOGLE INC., Mountain View, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 13/282,397

(22) Filed: Oct. 26, 2011

Related U.S. Application Data

(63) Continuation of application No. 13/166,732, filed on Jun. 22, 2011.

(51) Int. Cl.
*G06Q 30/00* (2012.01)
*G06Q 30/02* (2012.01)

(52) U.S. Cl.
CPC ................... *G06Q 30/0256* (2013.01)

(58) Field of Classification Search
CPC ....................................................... G06Q 90/00
USPC ........................................................ 705/14.1
See application file for complete search history.

(56) References Cited

U.S. PATENT DOCUMENTS

| 8,566,152 B1 * | 10/2013 | Shaw et al. ................. 705/14.1 |
| 2007/0094073 A1 * | 4/2007 | Dhawan et al. ................. 705/14 |

* cited by examiner

*Primary Examiner* — Daniel Lastra
(74) *Attorney, Agent, or Firm* — Birch, Stewart, Kolasch & Birch, LLP

(57) ABSTRACT

Systems and methods for improving the delivery of interactive advertisements are discussed herein. Systems and methods include approaches and solutions for boosting the rank of certain ads and/or ad types based on a combination of their interaction type and an ad interaction history for a given user, vertical, or aggregate indicator. Systems and methods also include suppressing ads unlikely to be interacted with from ranking and format boosting based on such ad interaction history.

22 Claims, 9 Drawing Sheets

Fig. 3a

| Interaction History Table 3000 | | | | |
|---|---|---|---|---|
| Ad ID 3010 | Interaction Type 3020 | Vertical 3030 | Interactor ID 3040 | Last Interaction 3050 |
| 1234 | 1 | 75 | 4321 | 1/1/11 11:11:11 |
| 7895 | 5 | 68 | 8547 | 2/2/10 13:12 |

Fig. 3b

| Interaction History Table 3110 | | | | |
|---|---|---|---|---|
| Ad ID 3140 | Interaction Type 3120 | Vertical 3130 | Interactions In Last Hour 3100 | Average User Rating 3150 |
| 1234 | 1 | 75 | 56 | 3.5 |
| 7895 | 5 | 68 | 109 | 4.25 |

Fig. 3c

| Interaction History Table 3210 | | | | |
|---|---|---|---|---|
| Ad ID 3240 | Interaction Type 3220 | Interactor ID 3230 | Last Interaction 3200 | Interaction Duration 3250 |
| 1234 | 1 | 75 | 1/1/11 11:11 | 00:00:55 |
| 7895 | 5 | 68 | 2/2/02 22:22 | 00:01:30 |

DELIVERING CONTENT TO USERS BASED ON ADVERTISEMENT INTERACTION TYPE

PRIORITY

This application is a continuation of co-pending application Ser. No. 13/166,732, filed on Jun. 22, 2011, for which priority is claimed under 35 U.S.C. §120, and the entire contents of which are hereby incorporated by reference in their entireties.

BACKGROUND

1. Field

The present disclosure pertains to delivering and tailoring advertisements for a potential viewer. The disclosure pertains more specifically to systems and methods of delivering advertisements to users based on how a user has previously interacted with an advertisement. A user performing a particular interaction may be more likely to repeat that interaction and therefore it would be advantageous to present the user with more advertisements configured for that interaction type.

The present disclosure pertains to delivering and tailoring advertisements for a potential viewer. The disclosure pertains more specifically to systems and methods of delivering advertisements to users based on how a user has previously interacted with an advertisement. A user performing a particular interaction may be more likely to repeat that interaction and therefore it would be advantageous to present the user with more advertisements configured for that interaction type.

2. Background

Currently, advertisements are delivered to users in interactive, online environments based on factors such as a user's known and/or inferred interests, the particular web page(s) they may be viewing, terms they may be searching for, and their prior history with respect to clicking on an advertisement. While effective, these delivery techniques omit a particular advance in online and other interactive advertisements—the possibility a direct interaction with the advertisement beyond that of a simple click.

Some advertisements have forms or form fields to "pre-load" searches or other operations on a landing page. Other advertisements, especially ones for mobile devices, have a "click to call" feature that enables a user to call the advertiser directly from the ad via clicking on a virtual button instead of having to navigate to a landing page, find a contact number, and manually dial the advertiser. Yet further advertisements may have a "click to chat" feature that opens up a chat window directly from a virtual link or button on the advertisement instead of having the user navigate to a support or help page on the advertiser's website to initiate an online chat.

SUMMARY

The ability to capture or otherwise maintain an awareness of user interactions with interactive advertisements and/or advertisement types may allow for improvements in selection and delivery of advertisements to users based on their propensity to engage in such interactions.

Variations of the advertisement delivery solutions discussed herein pertain to one or more methods of delivering an interactive advertisement to a user based on the user's prior interaction with advertisements having the same or similar interaction type. Interaction type in this case means a type of interaction other than a simple click on the advertisement. Interaction types may include click-to-call features where a user may, from a call-capable device such as a mobile phone, media tablet, or a computer equipped for use with Google Voice™ may allow for initiation of a telephone call by clicking a link or button in the advertisement, or registering a voice request during advertisement presentation, that dials the advertiser so that the user may speak to them directly. Interaction types may also include selectable forms where a user populates data into the form fields of an advertisement so that the advertisement directs the user to a landing page created based on the populated data. Further interaction types may include a range of capabilities beyond a simple click action, including surveys, live chat features, and connections to apps/utilities such as GPS tools.

Further scope of applicability of the systems and methods discussed will become apparent from the detailed description given hereinafter. However, it should be understood that the detailed description and specific examples, while indicating preferred embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein:

FIG. 3a depicts an embodiment of an interaction history table;

FIG. 3b depicts another embodiment of an interaction history table;

FIG. 3c depicts yet another embodiment of an interaction history table;

Figure 1:
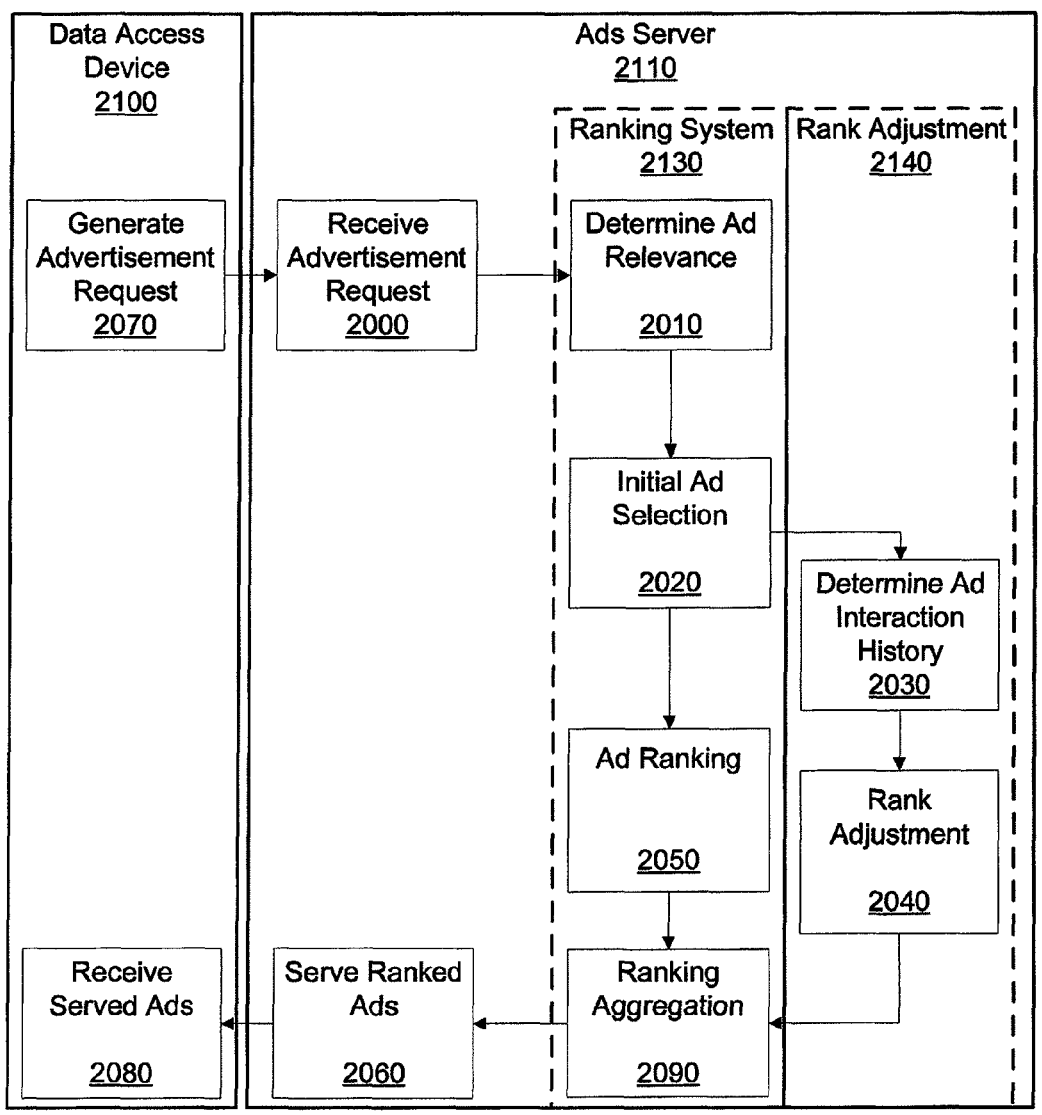
FIG. 1 depicts a block diagram of an embodiment of an ad ranking and format boosting process as discussed herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Although delivering advertisements to users of various data access and interface services and devices is already an established practice, the development of interactive advertisements that allow users to do more than simply select or "click" on the ad to be taken to a landing page allows for improvements and enhancements in ad delivery. Users that interact with certain types of interactive advertisements may be more likely to repeat that kind of interaction with future advertisements. For example, in an ad that has a click-to-call feature, whereby a user on a call-capable device (such as a mobile device, media tablet, or microphone-equipped computer) can place a telephone call to the advertiser by selecting or interacting with a particular portion of the advertisement, it may be advantageous to identify those users more likely to make click-to-call interactions so that they may be presented with click-to-call ads more often. A similar paradigm may be employed for advertisements that contain fillable forms, click-to-chat links/features, click-for-directions, or any other form of interactive advertisement format that goes beyond simple ad presentation with a landing page link.

In one variation of a method for improving ad delivery by evaluating and classifying users according to an advertisement interaction type, a unique user identifier (such as a cookie, phone number, IP address, email address, login ID, etc.) may be supplied by the device or the user and associated with both the search and/or data request triggering advertisement display as well as the subsequent interaction with the displayed advertisement.

Such per-user statistics and details on ad requests and ad interactions may be stored in one or more data repositories. In one variation, such a repository may have a user table, which is a table where each row is keyed by the user ID, or to a proxy thereof, and the columns contain statistics and details. In some variations, a hashing or other anoymization function may be used to prevent a user ID from being readily identified or associated with a particular individual, device, or locale. Preferably, access to the user table is restricted and mechanisms are in place to delete information from the table after a given time or upon user request. Some variations may be configured to enable users to decline to participate in such content delivery techniques. Users may opt out or otherwise refuse to have their ad request data and interactions measured and stored for analysis.

Statistics and details stored in such a repository may be aggregate values (number or rate of ad requests, ad interactions by interaction type, other clicks, etc.) or more detailed information such as timestamps of individual ad requests and interactions, interaction durations, and visit times of interaction targets.

A block diagram of an embodiment of an ad delivery improvement method is depicted in FIG. 1. In the variation shown, the method is initiated by an advertisement request 2070 generated at a data access device 2100. A data access device 2100 may include a mobile device such as a mobile phone, personal digital assistant, tablet or smartphone. Other variations of a data access device may include a computing device (mobile or not), an information kiosk, a data access service and/or utility such as a web browser, or a specialized media access device such as a GPS device or a music or video player.

An advertisement request may be generated 2070 based on device settings, application settings, automated tasks, geo-temporal factors, and/or user behaviors associated with the device 2100. User behavior may trigger an an ad request in a number of conventional ways, including conducting a search in a search engine, engaging in web browsing behavior through a sponsored and/or controlled interface, using an information kiosk and/or a data access service configured to display advertisements, or otherwise expressing interest in a particular product or service in a manner recognizable to an ad serving system.

The generated 2070 ad request is received 2000 by the ad serving system 2110, where an ad ranking system 2130 may examine and analyze the request to determine the most appropriate and relevant advertisements 2010. Ad ranking may be done using conventional methods, such as by analyzing keywords in a search, geo-temporal characteristics of the request, or some amount of browsing and/or data request history.

In some variations, an ad serving system 2110 may have a distinct ad selector portion separate from a ranking system 2130 or may be comprised of a collection of disparate specialized sub-systems. In some variations, a selector may be a specialized database querying unit that is configured to quickly retrieve advertisements based on the relevance determination results. In other variations, a selector may be a filtering unit configured to winnow down the relevant ads identified and retrieved or otherwise indicated from one or more ads databases during the relevance determination 2101 step In yet other variations, the ad selection aspect may be an integral part of the relevance determination 2101

Once ad relevance is determined 2101, one or more relevant ads are identified 2020 and then passed to a ranking application/portion where they are ranked 2050 according to some conventional/known pre-determined mechanism and/or algorithm. In some cases this may be done via auction where advertisers bid a certain amount to have their ad shown. In other variations, ranking may take into account various factors such as bid, expected click probability, relevance level, etc. In some variations, a ranking system may assign each identified ad an initial rank and then adjust the ranking based on the ranking factors. In some cases, each ad may be given a default rank of 1, and then have their ranking increased/adjusted so that each ad has an integer rank of 1 or greater and no two ads have the same rank. In non-format-based variations, the top-ranked ad or set of ads may then be served 2060 in response to the advertising request. The data access device 2100 may then receive the served ads 2080 and present them to a user or viewer. The number of ads displayed may be variously determined by device and/or data interface type, ad serving system parameters, user preferences, and other related factors.

To improve effectiveness of content delivery with respect to interactive advertisement types, such as click-to-call ads, an ad rank adjustment utility 2140 may be implemented either within or in addition to the ranking system 2130. An ad rank adjuster 2140 is a utility that may apply a ranking enhancer to an advertisement based on advertisement interaction type and/or interaction history. Variations of such a rank adjustment utility may evaluate the identified relevant ads 2020 based on information about recent interactions with advertisements 2030 by the data access device 2100 or a user/user profile associated therewith. In variations based on aggregate values, the information may be the overall tendency of a device or device user to interact with ads of a certain interaction type over a given time period (i.e. click-to-call interactions in the last hour, day, week, etc.). Such rank adjustment may therefore include either boosting the rank of ads for a given format/type, or reducing the rank of ads not having a particular format/type.

In variations storing more detailed information, a history of interacting with advertisements of a certain interaction type may be determined on a more granular level. A very recent click-to-call interaction, for instance, may be a stronger indicator than a week-old series of click-to-call interactions. By the same token, a previously interacted-with click-to-call advertisement may be a strong indicator to avoid presenting another advertisement bearing that same phone number and/or from the same advertiser. In yet further variations, geo-temporal factors, such as phone number area/location code (either of the caller or the advertiser called), may be used to boost advertisements also having a phone number with that area/location code. Such indicator strengths may be a factor considered by the rank adjustment utility and/or aspect in determining an extent of format boost, or in some cases, whether format boost is warranted at all. In some variations, such indicator strengths may be determined by one or more database query coupled with one or more threshold or logic checks. Such database-type determinations may be embodied in stored procedures, table views, or other database analysis and interaction techniques.

In yet further variations, ad interaction history determination 2030 may look at factors such as time of day and interaction duration or extent. In variations related to click-to-call advertisements, devices and/or users with a tendency to make click-to-call interactions at a certain time of day may have click-to-call ads boosted during that time. Also, calls exceeding a certain threshold duration in a click-to-call interaction may have click-to-call ads boosted by the rank adjustment and/or format booster function 2040. Calls that last longer than, for instance, 45 seconds, may be marked as real calls as opposed to accidental dials, hang-ups/dropped calls or other incomplete call attempts. Information about call duration may be stored in interaction histories, as shown in FIGS. 3a-c. Such call duration information 3250 may be acquired either from the calling device or, in cases where a call may be placed through an intervening voice-over-IP or similar utility, from the call routing/management service.

Variations that acquire the call information from the device may be well suited to smart-phone and/or other call-capable mobile device variations where the device is already configured to measure call durations. Variations that acquire the call information from a voice-over-IP service may be well suited to any internet-capable device (including smartphones, media tablets, netbooks, laptops, desktops, and even GPS devices) that can make telephone calls using the voice-over-IP service. In some variations, such interaction duration data may be stored in an interaction history for a given ad. Variations of interaction histories are depicted in FIGS. 3a-c and discussed later in this document.

In variations related to click-to-chat advertisements, similar measures about the frequency 3100 and duration 3250 of chats may be employed. In click-to-chat variations either a particular chat service used may provide information about chat duration, or overall chat duration may be replaced by a line count that determines the number of lines, characters, and/or words exchanged in the chat. In some variations, such word count measures may be more useful as a chat that has more than two or three lines in it is likely a real chat that has progressed past any automated welcome messages.

In variations related to fillable form interactions, factors of consideration may include a typical number of interactions a user makes with the form (i.e. how complete is the form data) and the amount of subsequent time spent by a user at the landing page. In yet further variations, ad style and layout may also be considerations. In some variations, expandable advertisements, which are ads that show as a small banner or icon but have a 'click to expand' or 'roll over to expand' feature that brings up a larger advertisement, may be identified for analysis and evaluation either as an independent format preference indicator or, in some cases, in conjunction with other factors such as device type, geo-temporal factors, connection type, time spent viewing the expanded ad, or even larger advertisement type (such as, for example, ads that expand to videos as opposed to large static ads or ones with a demo or game therein).

In further variations still, verticals may be analyzed so that interactive ads in certain interaction-prone verticals will get a ranking boost. For example, food delivery advertisements with a click-to-call feature for placing an order directly from the advertisement may be interacted with more often than other food delivery advertisements, suggesting that higher ranking of click-to-call ads in such a vertical is warranted.

In yet further variations, users may be analyzed and categorized in a similar way, so that for users and aggregate user groups that tend to make more click-to-call interactions rankings of click-to-call ads will be boosted in the ad serving system. Such vertical-based analysis may be collected by aggregating a total number of interactions for ads of a certain interaction type within a given time frame for a given vertical or set of verticals. Such information may be part of, or generated from, an interaction history.

In some variations, an advertisement may be associated with a particular interaction type and vertical. By aggregating interaction data for all advertisements with a certain vertical and interaction type, it may be possible to develop an understanding of which verticals and which advertisement interaction types are better suited for each-other. Variations of a rank adjuster 2140 using such information may provide a greater rank adjustment/format boost 2040 to ads of a certain interaction type within a certain vertical based on recent interaction history data indicating correlations between certain verticals and certain ad interaction types. For example, click-to-call ads for pizza delivery may warrant a format boost during certain times (i.e. Sundays during football season) and such format boosting may be indicated, independent of geo-temporal factors, by a strong recent interaction history showing high click-to-call response for pizza delivery ads in the past 30 to 90 minutes. Other examples of format boosting and/or rank adjustment approaches may be governed by other factors depending on the type of rank adjustment desired and the particular ads and/or ad types involved.

Variations of user history, verticals, and related advertisement serving/delivery and interaction data may be similarly analyzed for advertisements having features such as click-to-chat, fillable forms, and/or other interaction types. Each ad is associated with one or more verticals. In such variations, the verticals associated with prior ad interactions may be analyzed to determine if ads of a particular interaction format within a known vertical of interest should be boosted. A triggering event may also be associated with verticals. In such variations, a search related to a particular vertical or verticals may also be relevant for ad format boosting analysis where that search triggered the display of a particular ad but was itself associated with a vertical not associated with the displayed ad.

Once an ad interaction history is developed and/or determined 2030, a rank adjustment function 2040 and/or program generates a ranking multiplier, rank addition or subtraction factor, and/or other modifier that adjusts the results of the ad ranking 2050 based on the ad interaction history 2030 and a rank adjustment/format boosting paradigm. An incorporation of the ranking adjustment factor(s) may occur at the ranking aggregation 2090 stage where the outputs of the ranking engine are reconciled with the ranking modifiers generated by the rank adjuster 2040 to produce a final ad ranking. For variations meant to increase the rank of certain ad formats, rank adjustment by format boosting 2040 may be as simple as a ranking multiplier applicable to all ads of a certain interaction type, such as doubling the rank of any click-to-call ads that have been selected 2020 and ranked 2050. Other variations aimed at increasing the rank of certain ad formats may accomplish a similar result by halving or otherwise decreasing the rank of any ads other than those of the desired format/type.

Other variations of a format booster function 2040 may generate a ranking enhancement factor such as a fixed ranking boost or a ranking multiplier to either the initial ranking, final ranking, or as part of the overall ranking process. The ranking multiplier(s) employed by a format booster utility 2140 are not necessarily integers but may be selected for computational efficiency. Any ties in ranking resulting from format booster effects may be subjected to existing tie-breaker schemes within a ranking aggregation feature 2090 that uses or works with the format booster utility.

In one variation, a format booster function 2040 may be a simple function accepting fixed parameters as inputs. At its most simplistic, a variation may look something like:

If Ad_Type="click-to-call", and If Prior_Call_By_User=true
  Then Boost_Multiplier=#click-to-call-boost-value;
  Else Boost_Multiplier=1.

In other words, in the example above, if a user has made a "click-to-call" interaction within a previous time period (the time period window may be configured/determined according to preferences or settings within the format booster 2140 or the ranking system 2130 or both), a relevant click-to-call ad will get a ranking multiplier whereas other types of ads will not.

In other variations, a format booster function 2040 may employ more complicated formulas such as those using models derived from machine learning techniques. One variations of a format booster function or program 2040 may be tied with active, ongoing analysis of historical data 2030 for users and for verticals and maintain a set of multipliers for each user, user group, and/or vertical. Other variations of a format booster utility 2140 may be dynamic utilities that analyze a particular user's advertisement interaction history on-demand. Yet further variations may be a combination of ongoing verticals analysis and on-demand user analysis for ad format boosting.

In some variations, the format booster may not boost the overall ranking of an ad, but may only boost one particular ranking aspect. In one variation, the format booster may only increase the effective/expected ad click-through-rate (CTR). CTR is only one factor in an ad ranking scheme. Other factors may include the comparative relevance, the bid offered by an advertiser (in auction settings), the expected conversion rate for the ad, geo-temporal factors, etc. In a CTR-only boosting variation, the ad ranking 2050 may then be re-computed or adjusted in a ranking aggregation 2090 operation that either updates the ranking based on the CTR adjustment factor and/or re-calculates the rankings with the new/adjusted CTRs. In some such variations, an aspect-specific format booster may be an integral portion of an overall ranking system/portion.

In further variations, such an aspect-specific format booster may be further coupled with a general format booster or with other aspect-specific format boosters. In further variations still, an overall ranking system may have an integrated configurable format booster that may be triggered to provide general format boosting and/or to boost one or more specific ranking aspects based on ad interaction type and/or interaction history for that type.

Some variations of format boosting 2040 can compute the ad ranking 2050 and format boost factor 2040 simultaneously and/or independently and then aggregate 2090 both results for a final rating. Other variations may operate sequentially such that format boost factor 2040 is only calculated and applied after the initial ranking is performed.

In some variations, the format boost factor generation is accomplished by reading from a database for a value. In such a variation, the applicable format boost factor for a given advertisement to be shown to a given user may be accomplished by an ongoing calculation of things like user preference for interaction with particular ad format types both within and across verticals and simply reading a likely CTR and/or overall ranking boost factor from a table of calculated values.

The format boosted ads, now potentially aggregated 2090 into a new ranking order, are then served 2060 to the data access device 2100, which receives the served ads 2080 and presents them in an appropriate format. The ads server 2110 may only serve 2060 some portion of the ranked 2050, format boosted 2040 ads. The number of ads served may be variously determined by device and/or data interface type, ad serving system parameters, user preferences, and other related factors.

In some embodiments, the interactive portion of the advertisement may itself connect directly to the product being sold. In some variations this may include pay-per-use or pay-per-time period telephone or online chat services such as paid entertainment and/or technical support. In other variations, this may include "click-to-order" goods and services such as food delivery and/or on-demand media access. In such variations, identification and delivery of advertisements based on prior history is especially relevant as the advertisement interaction is direct evidence of both click-through rate and ad-to-sale conversions. In such variations, some format boosting formulas 2040 may apply boost factors to CTR and to expected conversion rate for such ads where a click is tantamount to a conversion. Privacy concerns may be addressed in such situations by abstracting away any identifying information of the user and instead mapping them to a unique key that is wholly distinct from any identifying information.

Figure 2A:
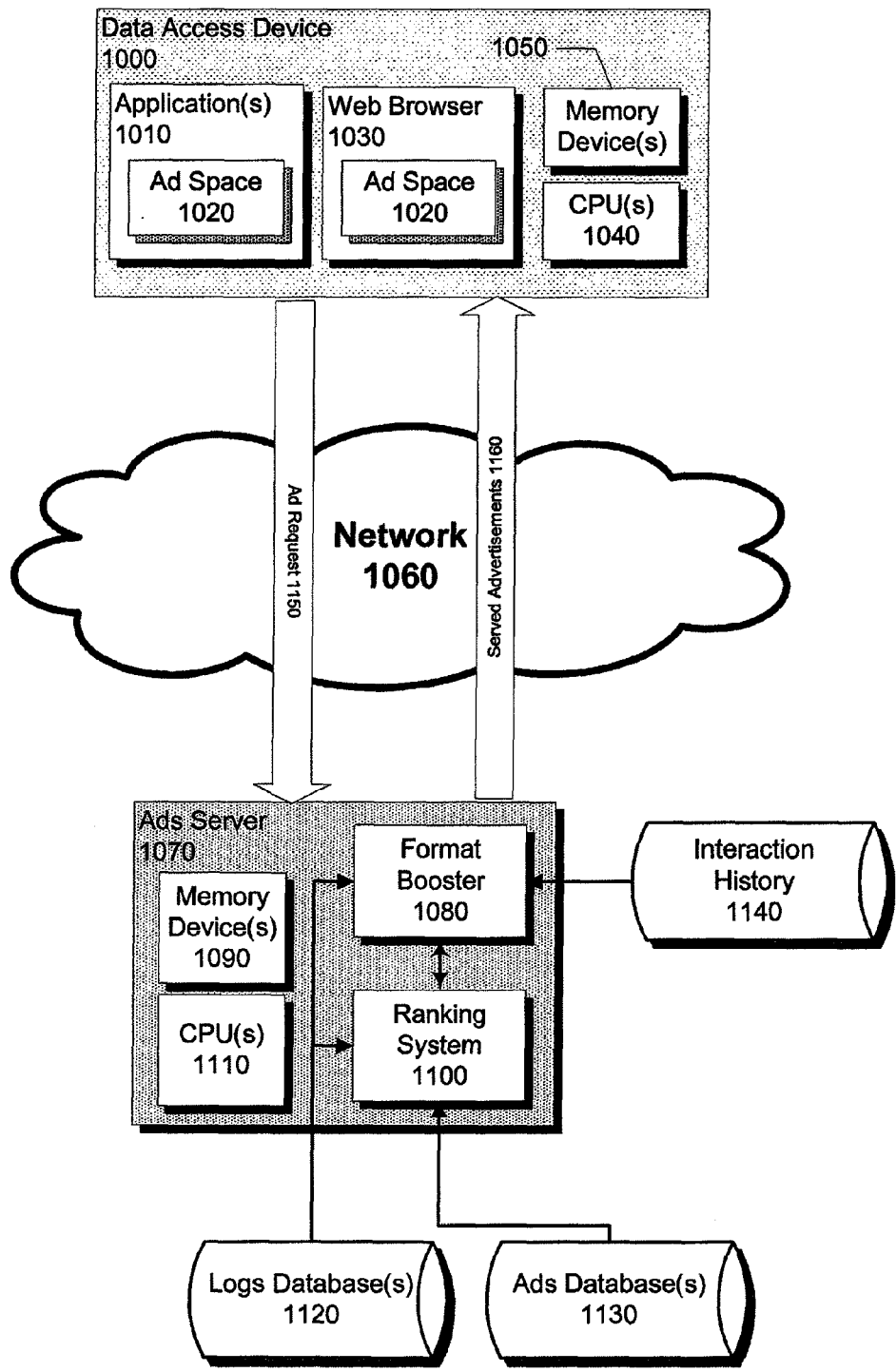
FIG. 2a depicts a block diagram of an embodiment of an ad ranking and format boosting system as discussed herein.

FIG. 2a depicts a block diagram of an embodiment of an ad serving system that employs a format booster utility in addition to a general ad ranking system. In the embodiment shown, a data access device 1000 communicates with an ads server 1070 over a network 1060. Embodiments of a data access device 1000 may include a mobile device such as a cellular phone, personal digital assistant, smart-phone, GPS device, tablet, media player or presentation device, netbook and/or notebook computer, or other portable or semi-portable computing and/or data access and presentation device. Other embodiments of a data access device 1000 may include desktop or fixed location computing and/or media access devices, information kiosks, and virtual devices such as software applications, media access programs, and/or web browsing tools.

Embodiments of a data access device 1000 may include one or more memory devices 1050 for information storage and one or more processors 1040 for data processing. The memory devices(s) 1050 and processor(s) 1040 may operate in concert to run one or more applications 1010 such as data exchange, media display, information search, social network, game and/or GPS/location programs. In some variations, one or more of these applications 1010 may be equipped with ad space 1020 for the display and/or presentation of ads 1160 transmitted via the network 1060 to the data access device 1000 from one or more ad servers 1070. The memory 1050 and processor 1040 may also operate in concert to run one or more web browsing applications or services 1030. Embodiments of a web browser may include application- or app-based browsers or a built-in web browsing tool included in an operating system. Embodiments of a web browser 1030 may also be equipped with ad space 1020 for the display and/or presentation of ads 1160 transmitted via the network 1060 to the data access device 1000 from one or more ad services.

Embodiments of a network 1060 may include public, private, cellular, telephone, radio-frequency, Ethernet, optical, encrypted, open, IP-based, wide-area, local-area, and/or hard-wired data transfer pathways, and/or combinations thereof, suitable for exchange of information between two or more devices connected thereby.

Embodiments of an ads server 1070 may include one or more computing devices or components thereof, which may be configured to operate collectively, independently, or otherwise collaboratively to serve ads 1160 in response to advertisement requests 1150 from a data access device 1000.

Embodiments of an ads server 1070 may include one or more memory devices 1090 for information storage and one or more processors 1110 for data processing. The memory device(s) 1090 and processor(s) 1110 may operate in concert to execute the various functions and aspects and run the associated applications of the ads server. In some variations, an ads server may be equipped with modules, functional units, sub-systems, or programs/applications or portions thereof that perform ad selection and ranking 1100 (and the attendant log database 1120 and ad database 1130 interface features), and, in format-boosting variations, ad format boosting 1080 (and the attendant historical data/log database 1120 interface features).

Embodiments of an ad selection and ranking system 1100 and ad format booster 1080 may function independently, collectively, and/or interoperably as described above. In some variations, the ad ranking system 1100 may be an associated dedicated server connected to or integrated with an ads database. In other variations, an ad selection and ranking tool 1100 may be a program or a functional module of an overall ads server application or applications suite. The ad selection and ranking aspect 1100 may be configured to access or otherwise interface with an ads database 1130 in order to identify and extract from the ads database 1130 ads relevant to an incoming ad request 1150.

Figure 2B:
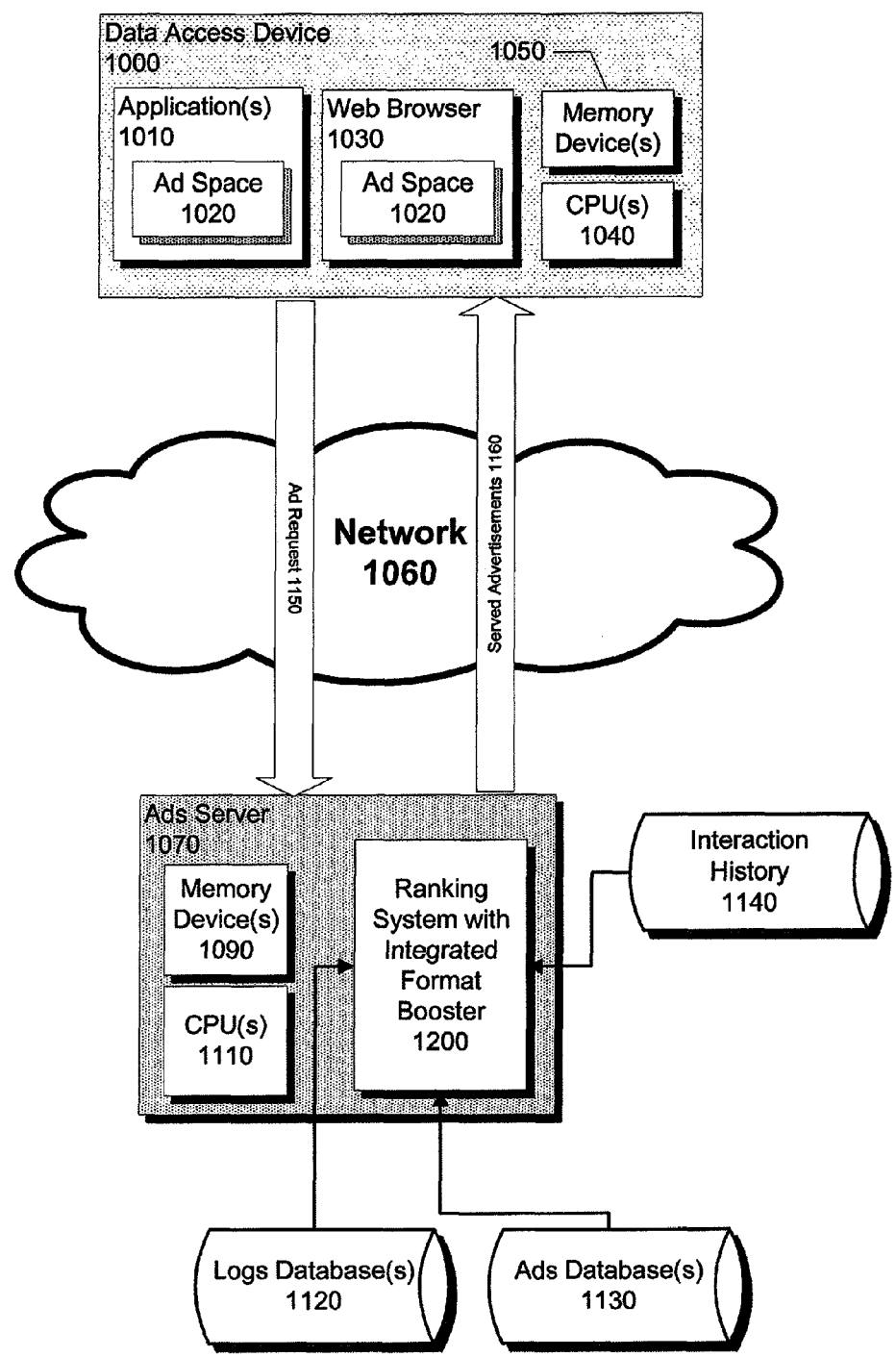
FIG. 2b depicts a block diagram of an embodiment of an ad ranking and format boosting system as discussed herein.

Embodiments of an ad selection and ranking system 1100 may include a ranking feature that ranks each extracted advertisement according to one or more ranking schemes such as auctions, joint-ranking models, and/or other ranking schemes. Embodiments of a ranking system 1100 may be realized through programs or program modules running on the ad server(s) 1070 and/or through dedicated hardware systems or modules for the express purpose of ranking ads. In some embodiments, the ranking system may be functionally intertwined with the format booster 1080 such that both are part of the same program, program portion and/or hardware system or module. Such an embodiment is depicted in FIG. 2b, where the ranking system 1200 has an integrated format booster portion and the interaction history 1140 log data is fed directly into this combined ranking and format boosting unit 1200. In other embodiments, the ranking system 1100 may be distinct from the format booster.

In the embodiment shown, the ranking system 1100 selects ads from the ads database(s) 1130 and ad performance data from one or more historical log databases 1120. Variations of the ad performance data may include ad CTR, conversion rate, cost per click, cost per impression, and other relevant factors indicating ad popularity and effectiveness. The ranking system 1100 may then rank the ads based on the ad performance data to determine an initial set of most likely or most suitable ads for serving to the data access device 1000.

Subsequently or, in some embodiments, simultaneously, a format booster 1080 operates on the identified and/or ranked ads based on ad performance and user/device behavior/preference data compiled from various historical log databases 1120 and also from an interaction history 1140. In some variations, an interaction history 1140 may be part of the overall logs 1120. In other variations, it may be an independent database or set of tables that is logically and/or physically distinct from other logs databases 1120.

Variations of an interaction history 1140 may include information about the recent actions of a device or device user with respect to certain types of interactive ads (such as click-to-call, click-to-chat, fellable form, expandable, etc.). The interaction history 1140 may include general aggregate information about types of ad interactions, specific information about individual ad interactions, and/or combinations thereof.

In some variations, the interaction history 1140 may also include specific, recently interacted-with ads for a particular user, device, profile and/or account. In further variations, aggregate information may include information about verticals, demographics, and/or geo-temporal factors associated with prior or ongoing ad interaction levels for one or more interactive ad types.

Embodiments of the format booster may be configured to specifically request, identify, and operate on one or more ad performance indicators (CTR, conversion rate, etc.) related to ads of one or more interaction types (i.e. click-to-call, click-to-chat, click-to-order, etc.) based on the interaction history 1140 data for a given user, device, account, and/or profile. In some embodiments, interactive type ads that are indicated in the interaction history 1140 as having been recently interacted with by the particular device, user, profile, and/or account may be suppressed or otherwise down-ranked so that they are not displayed again too soon after the interaction.

In other embodiments, ads of a particular interaction type that is determined, from the interaction history 1140, as a likely or preferred interaction type may have their rank boosted to improve their likelihood of presentation. In embodiments where the ad interaction type is also a conversion indicator (i.e. click-to-call for a paid service such as an entertainment or technical support line), the format booster 1080 may be configured to rank such ads even more highly for users and/or devices showing a high likely/historical conversion rate.

In some embodiments of the ads server, after the format booster 1080 or a ranking aggregation tool (not shown) adjusts the ranking of the identified ads accordingly, one or more of the top-ranked ads are served 1160 to the data access device 1000 for display and/or presentation thereon.

An embodiment of an interaction history table is shown in FIG. 3a. In the embodiment shown, an ad interaction history table 3000 may have columns indicating an identifier for a unique ad ID 3010, an ad interaction type 3020, and an associated vertical 3030. The interaction history table may also have a unique identifier for an interactor 3040 and a last interaction timestamp 3050. An interactor may include a device, user, account, and/or profile associated with a particular ad interaction (such as a click-to-call or click-to-chat or expansion or fillable-form submission). Although only two rows are shown in the figure, an interaction history table may up to thousands or millions of rows.

In other variations, an interaction history table may include columns related to a total number of interactions over a given time period, total interactions for a given interactor and/or interactor group or type (with, in some variations, attendant interactor group or type information). Such a variation is depicted in FIG. 3b. In the variation shown, the interaction history table 3110 includes columns for an ad ID 3140, an ad interaction type 3120, an associated vertical 3130, and a number of interactions within a given time period 3100. Also shown is an average user rating 3150.

In the variation depicted, the time period is an hour. In further variations, the time period may be larger or smaller depending on the particular requirements/interests being evaluated or the level of granularity sought. In even further variations, the time period may be geo-temporally indicated as well, with an additional column showing a geographic indicator associated with the ad ID. In other variations, the ad ID itself may pertain to a geographically targeted advertisement, thereby intrinsically including geographic data in the table. In yet further variations, ad ids may be omitted and only aggregate information for ads by interaction type may be reported for a particular vertical.

In yet further variations, an ad may be associated with a rating tool such that users may give a rating, such as a star-rating (1 to 5 stars, for instance) to an advertisement either when it is presented or after they interact with it. Such average user rating data 3150 may be used to further modify or evaluate an interaction history. An ad with many interactions but a low average rating, for instance, may be indicative of an ad that is getting many negative interactions and therefore one that may not be suitable for presentation. Similarly, some variations may track a rating change over time (such as in an hour) to see if an ad is becoming more or less appealing/popular.

In yet further variations, an interaction history table may include information about interaction duration. Such a variation is shown in FIG. 3c. In the variation shown, the interaction history table 3210 includes columns for an ad ID 3240, an ad interaction type 3220, an interactor ID 3230, a last interaction timestamp 3200, and an interaction duration 3250. The variation depicted gives a last interaction time and duration for a given interactor interacting with a given advertisement.

Other variations may omit the interactor and instead show aggregate information for a particular ad and/or vertical, such as total interactions in a given time period for the ad and/or vertical along with an average interaction duration. In some variations, multiple statistical measures may be provided, including mean, median, and mode durations, standard deviation, and other indicators of data distribution. Such statistical data may be provided for interaction duration as well as, in some variations, for the distribution of interactions within the time period. Statistical indicators relating to interaction frequency may show trends of expected increase or decrease in response/interaction.

In further variations still, the interaction history table may be a view or query dynamically created for a particular interactor ID from one or more larger underlying data tables. In such variations, the interactor ID may be omitted or be represented by an overall table ID. In yet further variations, geo-temporal factors may also be indicated in the interaction history table, including factors such as relative time of interaction for the given location (i.e. morning, noon, evening, etc.), specific interaction locale, and, in some variations, particular circumstances of movement or transit associated with the interaction.

In some variations, an interaction history table may also be used for advertiser budding by associating query terms with an interaction type and a vertical. In such variations, advertisers may be able to bid for ads of a one or more interaction type 3020 within one or more verticals 3030 based on historical performance data of ads of those interaction type(s) 3020 in relation to those vertical(s) 3030. Such bidding may be performed using currently known and/or implemented auction techniques that incorporate an awareness of ad interaction type and vertical associations/relationships. Such an approach may allow for further increases in ad ranking according to interaction type simply by allowing advertisers to bid more based on expected response rates inferred from historical data.

The embodiments shown in FIGS. 1 and 2a depict format boosting tools and/or utilities that can be separated—physically and/or logically—from the ranking system. Some variations of a ranking system, however, may be integrally designed to perform format boosting with no clear separation between the ranking engine and the format boosting aspect. An block diagram of an embodiment of an ad ranking and format boosting method where the format boosting is an integral part of the ranking is shown in FIGS. 4a-b.

Figure 4A:
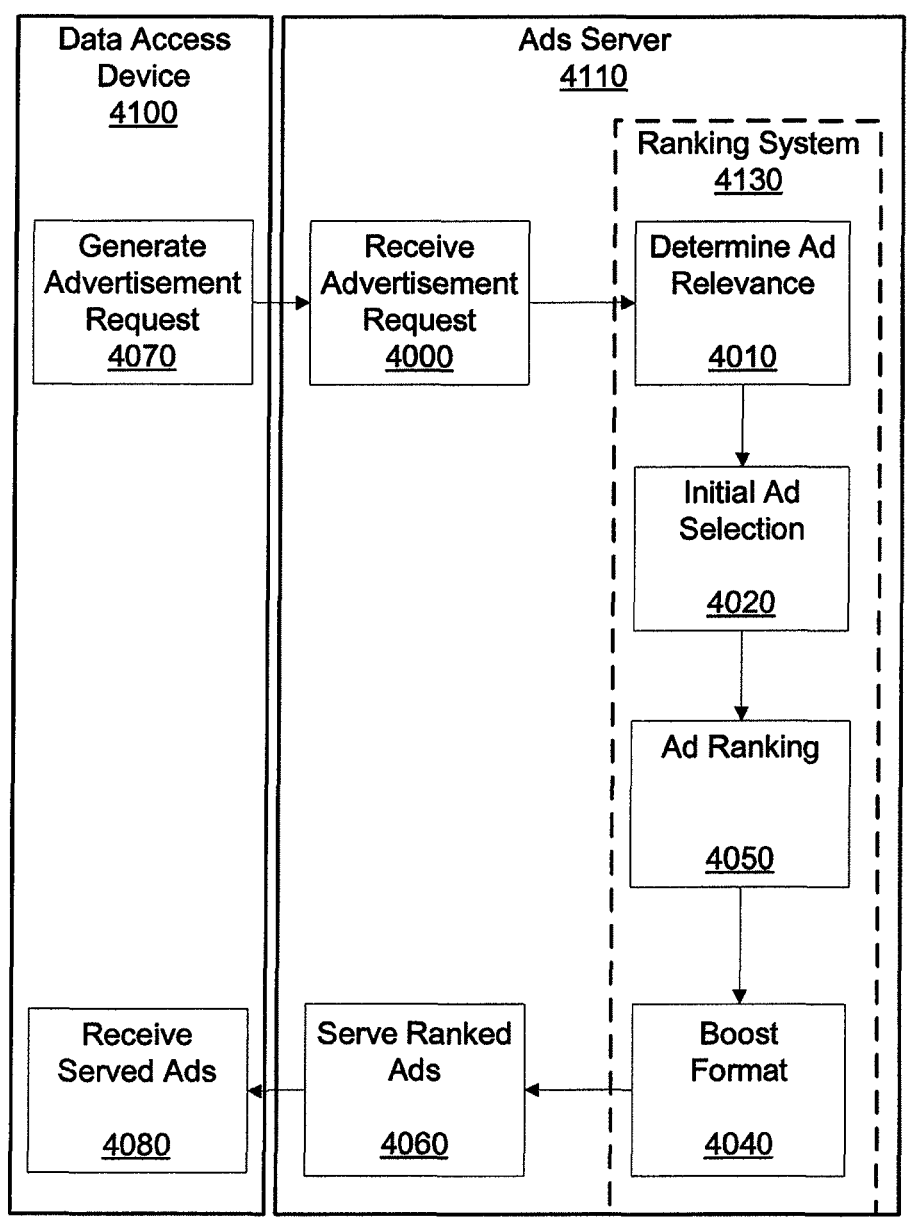
FIG. 4a depicts a block diagram of an embodiment of an ad ranking and format boosting process as discussed herein.
Figure 4B:
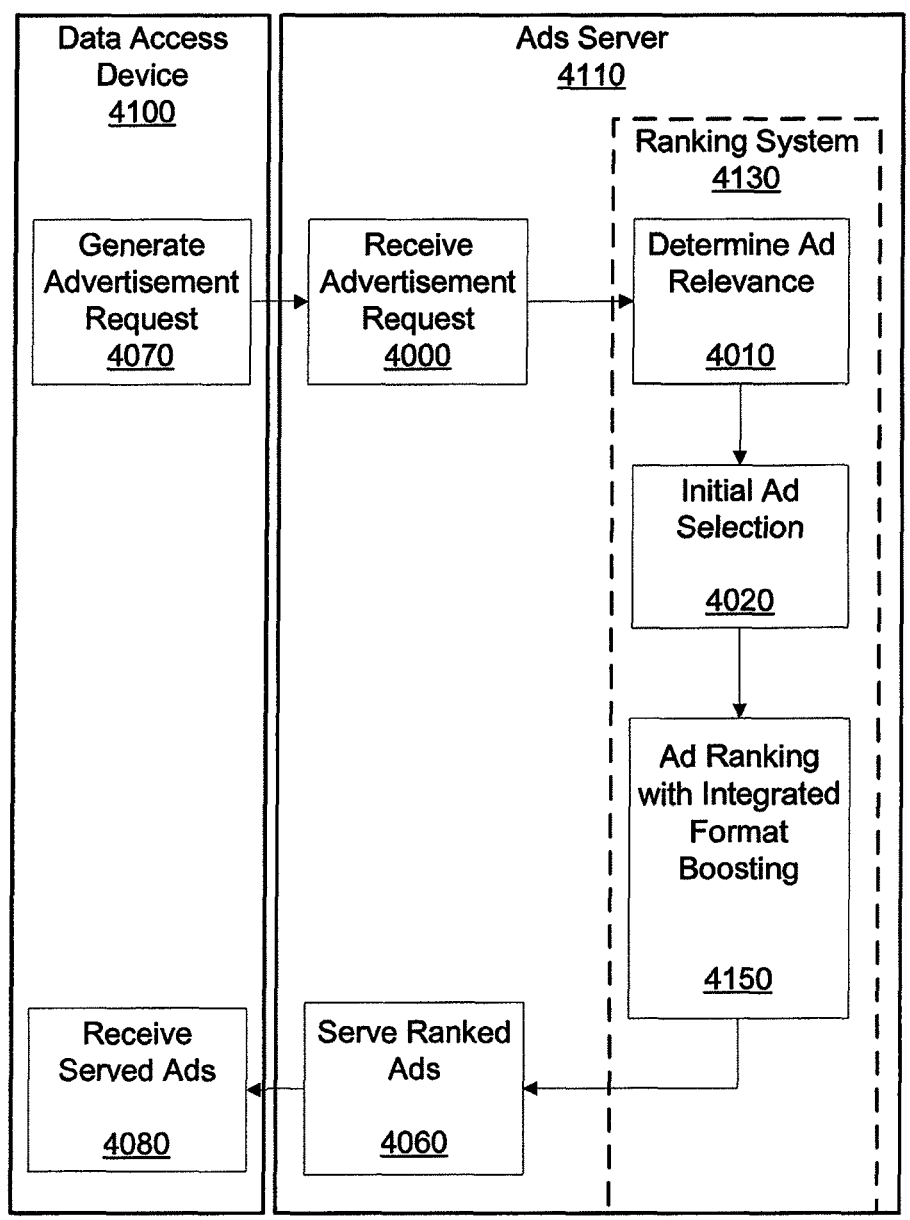
FIG. 4b depicts a block diagram of an embodiment of an ad ranking and format boosting process as discussed herein.

In FIG. 4a, a data access device 4100 may generate an advertisement request 4070 due to a range of factors or triggering events (such as, for instance, a keyword search). An ads server 4110 may receive the advertisement request 4000 via a public, private, electronic, optical, radio-frequency, wire-connected, cellular, and/or other type of communication network or some combination thereof. The advertisement request 4000 may then be passed to a ranking system 4130 that may be an application and/or sub-module or sub-system of an overall ads server 4110. The ranking system may then analyzed the advertisement request 4000 to determine ad relevance 4010. This may be accomplished by analyzing keywords and indicators in the advertisement request that relate to verticals, geo-temporal factors, particular goods and/or services, and other aspects related to the potential relevance of an advertisement.

In some variations, relevancy determination 4010 may include term expansion and/or query expansion to attach semantically or contextually related terms to the advertisement request in an effort to more clearly focus and/or determine the scope and intent of the ad request.

Once the overall relevance 4010 is determined, ads relevant to the advertisement request may be selected 4020 from an ads database. These ads may be selected based on the relevancy factors 4010 as well as advertiser bid, advertiser budget, or other factors. In some bid-based variations, there may be a relevancy threshold requirement so that even very highly bid irrelevant ads will not be selected. In some budget-sensitive variations, an otherwise relevant ad may not be selected if doing so will exceed a budget cap or spending plan requested/set by the advertiser.

Once the ads are selected, they may be subject to ranking 4050 based on factors such as bid, relevance, and/or historical data such as pas CTR, conversion rate, cost per click, cost per impression, etc. The ranked ads 4050 may then be subjected to format boosting 4040 based on the above-discussed factors or ad format preference for a given user or device. In such a variation, the format boosting may be a feature always performed by the ranking system such that as a user continues to exhibit and/or changes preferences for ad interaction types, the format booster will accordingly maintain or alter the makeup of ads displayed in concert with the user's preferences for ad format.

Once the ads are ranked 4050 and format boosted 4040, they may be served 4060 back to the data access device 4100, which may receive the served ads 4080 over one of several communication techniques/networks as discussed above and then present the ads accordingly.

A variation showing a combined ranking and format boosting process is shown in FIG. 4b. As depicted in FIG. 4a, the results of an ad selection process 4020 feed into the ranking process 4150. The ranking process, however, has an integrated format boosting aspect 4150 such that the ranking and format boosting portions of the ranking system are indistinguishable. The ranked and format boosted 4150 ads are then served 4060 as previously discussed.

In another variation of a method for improving ad delivery by evaluating and classifying users according to an advertisement interaction type, a unique user identifier (such as a cookie, phone number, IP address, email address, login ID, etc.) may be supplied by the device or the user and associated with both the search and/or data request triggering advertisement display as well as the subsequent interaction with the displayed advertisement. Instead of and/or in addition to enabling ad format boosting, as discussed in the variations above, such per-user statistics (which, as noted above, may be aggregated and/or detailed, may be hashed, anonymized, or otherwise processed to prevent a user ID from being readily identified or associated with a particular individual, device, or locale and may also be deleted periodically and/or on-demand) may also enable ad suppression to prevent advertisements that a user is unlikely to interact with from being selected for ranking. Such variations enable faster processing and response, and also improve ad ranking auctions by removing ads/bidders from consideration based on a-priori knowledge of a particular consumer's habits. Advertisers also realize benefits from such a method by spending less on the display/presentation of potentially ineffective ads.

Yet further variations may omit a ranking process 4150 and instead apply a the format boosting aspect 4150 directly to the ad selection process 4020 such that the selected ads are not ranked but instead the selection process itself finds the most suitable ad based, in part, on the format boosting aspect 4150 that indicates certain advertisement types as more suitable/desirable for presentation to a user. Such variations may have a direct database search with one or more threshold criteria that may be modified and/or otherwise adjusted based on the format boosting aspect 4150. In some variations, the first ad meeting/exceeding one or more threshold criteria may be selected for presentation to the user. The format boosting aspect may work to alter the threshold level the ad is evaluated against and/or increase a calculated value or weight factor of the ad to make it more likely that an ad of a particular format and/or interaction type will meet/exceed the selection threshold criteria.

Figure 5:
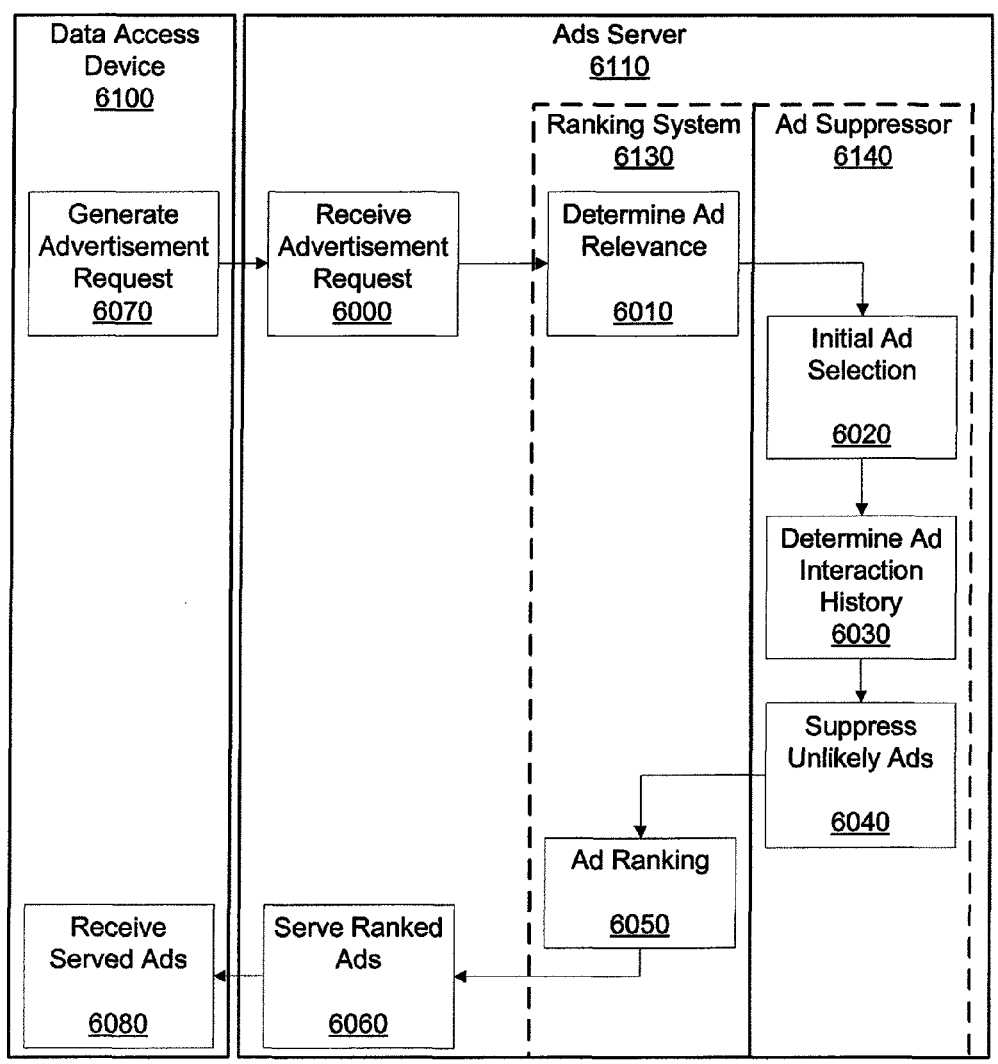
FIG. 5 depicts a block diagram of an embodiment of an ad selection suppression and ranking process as discussed herein.

A block diagram of an embodiment of such an ad delivery improvement method is depicted in FIG. 5. In the variation shown, the method is initiated by an advertisement request 6070 generated at a data access device 6100. A data access device 6100 may include any of the previously-mentioned variations discussed with respect to FIG. 1.

An advertisement request may be generated 6070 based on device settings, application settings, automated tasks, geo-temporal factors, and/or user behaviors associated with the device 6100. User behavior may trigger an an ad request in a number of conventional ways, including conducting a search in a search engine, engaging in web browsing behavior through a sponsored and/or controlled interface, using an information kiosk and/or a data access service configured to display advertisements, or otherwise expressing interest in a particular product or service in a manner recognizable to an ad serving system.

The generated 6070 ad request is received 6000 by the ad serving system 6110, where an ad ranking system 6130 may examine and analyze the request to determine the most appropriate and relevant advertisements 6010. Ad ranking may be done using conventional methods, such as by analyzing keywords in a search, geo-temporal characteristics of the request, or some amount of browsing and/or data request history.

In some variations, an ad serving system 6110 may have a distinct ad selector portion 6020 separate from a ranking system 6130 or may be comprised of a collection of disparate specialized sub-systems. In some variations, a selector 6020 may be a specialized database querying unit that is configured to quickly retrieve advertisements based on the relevance determination results. In other variations, a selector may be part of a suppression or filtering unit 6140 configured to winnow down the relevant ads identified and retrieved or otherwise indicated from one or more ads databases during the relevance determination 6010 step.

Once ad relevance is determined 6010, one or more relevant ads are identified 2020, the ad interaction history for a particular user, user group, vertical, and/or vertical group associated with the ad request may be analyzed 6030. Variations of such an interaction history analysis utility 6030 may evaluate the identified relevant ads 6020 based on information about recent interactions by the data access device 6100 or a user/user profile associated therewith. In variations based on aggregate values, the information may be the overall tendency of a device or device user to interact with or avoid ads of a certain interaction type over a given time period (i.e. click-to-call interactions in the last hour, day, week, etc.).

In variations storing more detailed information, a history of interacting with advertisements of a certain interaction type may be determined 6030 on a more granular level. A very recent decline in click-to-call interactions, for instance, may be a stronger indicator than a general trend of low click-to-call interaction. By the same token, a previously interacted-with click-to-call advertisement may be a strong indicator to avoid presenting another advertisement bearing that same phone number and/or from the same advertiser.

In yet further variations, geo-temporal factors, such as phone number area/location code (either of the caller or the advertiser called), may be used to flag advertisements not having a phone number with that area/location code. Such indicators (and their relative strengths) may be determined by one or more database query coupled with one or more threshold or logic checks. Such database-type determinations may be embodied in stored procedures, table views, or other database analysis and interaction techniques. The determined ad interaction history may then be used to suppress 6040 ads that the user is unlikely to interact with from the ranking 6050 process. Such suppression 6040 completely removes the ads from consideration before they reach the ranking 6050 process, thereby reducing the number of ads that need to be ranked.

In yet further variations, ad interaction history determination 6030 may look at factors such as time of day and interaction duration or extent. In variations related to click-to-call advertisements, devices and/or users with a tendency to avoid click-to-call interactions at a certain time of day may have click-to-call ads indicated for suppression during that time. Also, calls below a certain threshold duration in a click-to-call interaction may be an indicator for click-to-call ad suppression by the ad suppressor 6140. Calls that last less than, for instance, 30 seconds, may be marked as accidental calls, hang-ups/dropped calls or other incomplete call attempts. Such call duration information may be acquired either from the calling device or, in cases where a call may be placed through an intervening voice-over-IP or similar utility, from the call routing/management service.

Variations that acquire the call information from the device may be well suited to smart-phone and/or other call-capable mobile device variations where the device is already configured to measure call durations. Variations that acquire the call information from a voice-over-IP service may be well suited to any internet-capable device (including smartphones, media tablets, netbooks, laptops, desktops, and even GPS devices) that can make telephone calls using the voice-over-IP service. In some variations, such interaction duration data may be stored in an interaction history for a given ad. Variations of interaction histories are depicted in FIGS. 3*a-c*.

In variations related to click-to-chat advertisements, similar measures about the frequency and duration of chats may be employed as suppression indicators. In click-to-chat variations either a particular chat service used may provide information about chat duration, or overall chat duration may be replaced by a line count that determines the number of lines, characters, and/or words exchanged in the chat. In some variations, such word count measures may be more useful as a chat that has only two or three lines in it is likely a dropped, discarded, or accidental chat.

In variations related to fillable form interactions, factors of consideration may include a typical number of interactions a user makes with the form (i.e. how complete is the form data) and the amount of subsequent time spent by a user at the landing page. In yet further variations, ad style and layout may also be considerations. In some variations, expandable advertisements, which are ads that show as a small banner or icon but have a 'click to expand' or 'roll over to expand' feature that brings up a larger advertisement, may be identified for analysis and evaluation either as an independent format preference indicator or, in some cases, in conjunction with other factors such as device type, geo-temporal factors, connection type, time spent viewing the expanded ad, or even larger advertisement type (such as, for example, ads that expand to videos as opposed to large static ads or ones with a demo or game therein).

In further variations still, verticals may be analyzed so that interactive ads in certain verticals will be indicated for suppression. For example, food delivery advertisements with a fillable form feature for placing an order directly from the advertisement may be interacted with much less often via mobile device than other food delivery advertisements, suggesting that suppression of fillable form ads in such a vertical is warranted. In yet further variations, users may be analyzed and categorized in a similar way, so that for users and aggregate user groups that tend to avoid certain ad interaction types, ads of that interaction type will be suppressed 6040 from the ranking 6050 process. Such vertical-based analysis may be collected by aggregating a total number of interactions for ads of a certain interaction type within a given time frame for a given vertical or set of verticals. Such information may be part of, or generated from, an interaction history.

In some variations, an advertisement may be associated with a particular interaction type and vertical. By aggregating interaction data for all advertisements with a certain vertical and interaction type, it may be possible to develop an understanding of which verticals and which advertisement interaction types are better suited for each-other. Variations of an ad suppressor 6140 using such information may enable computational load easing by only ranking 6050 ads of a certain interaction type within a certain vertical based on recent interaction history data indicating correlations between certain verticals and certain ad interaction types. For example, click-to-call ads for pizza delivery may warrant suppression during certain times (i.e. weekday mornings) and such suppression 6040 may be indicated, independent of geo-temporal factors, by a determination of recent interaction history 6030 showing little or no click-to-call response for pizza delivery ads in the past 30 to 90 minutes.

Variations of user history, verticals, and related advertisement serving/delivery and interaction data may be similarly analyzed for advertisements having features such as click-to-chat, fillable forms, and/or other interaction types. Each ad is associated with one or more verticals. In such variations, the verticals associated with prior ad interactions may be analyzed to determine if ads of a particular interaction format within a known vertical of interest should be suppressed. A triggering event may also be associated with verticals. In such variations, a search related to a particular vertical or verticals may also be relevant for ad suppression analysis where that search triggered the display of a particular ad but was itself associated with a completely unrelated vertical.

Once an ad interaction history is developed and/or determined 6030, an ad suppression function 6040 and/or program flags ads in the initial ad selection 6020 set based on the ad interaction history 6030 and a suppression paradigm.

Variations of a suppressor function 2040 may generate a suppression flag based on a simple function accepting fixed parameters as inputs. At its most simplistic, a variation may look something like:

If Ad_Type="click-to-call", and If Prior_Call_By_User=false
   Then Suppression_Flag=1;
   Else Suppression_Flag=0.

In other words, in the example above, if a user has not made a "click-to-call" interaction within a previous time period (the time period window may be configured/determined according to preferences or settings within the suppressor function 6040 or the ad interaction history determination 6030 or both), an otherwise relevant click-to-call ad will get flagged for suppression from ranking 6050.

In other variations, a suppressor function 6040 may employ more complicated formulas such as those using models derived from machine learning techniques. One variations of a suppressor function or program 6040 may be tied with active, ongoing analysis of historical data 6030 for users and for verticals and maintain a set of multipliers for each user, user group, and/or vertical. Other variations of an ad suppressor 6140 may be dynamic utilities that analyze a particular user's advertisement interaction history on-demand. Yet further variations may be a combination of ongoing verticals analysis and on-demand user analysis for ad suppression.

In some variations, ad interaction history determination 6030 is accomplished by reading from a database for one or more values. In such a variation, the applicable suppression decision for a given advertisement may be accomplished by an ongoing calculation of things like user preference for interaction with particular ad format types both within and across verticals and simply reading a likely CTR from a table of calculated values.

The remaining ads are then passed to a ranking application/portion where they are ranked 6050 according to some conventional/known pre-determined mechanism and/or algorithm. In some cases this may be done via auction where advertisers bid a certain amount to have their ad shown. In other variations, ranking may take into account various factors such as bid, expected click probability, relevance level, etc. In some variations, a ranking system may assign each identified ad an initial rank and then adjust the ranking based on the ranking factors. In some cases, each ad may be given a default rank of 1, and then have their ranking increased/adjusted so that each ad has an integer rank of 1 or greater and no two ads have the same rank. The top-ranked ad or set of ads may then be served 6060 in response to the advertising request. The data access device 6100 may then receive the served ads 6080 and present them to a user or viewer. The ads server 6110 may only serve 6060 some portion of the ranked 6050 ads. The number of ads displayed may be variously determined by device and/or data interface type, ad serving system parameters, user preferences, and other related factors.

Figure 6:
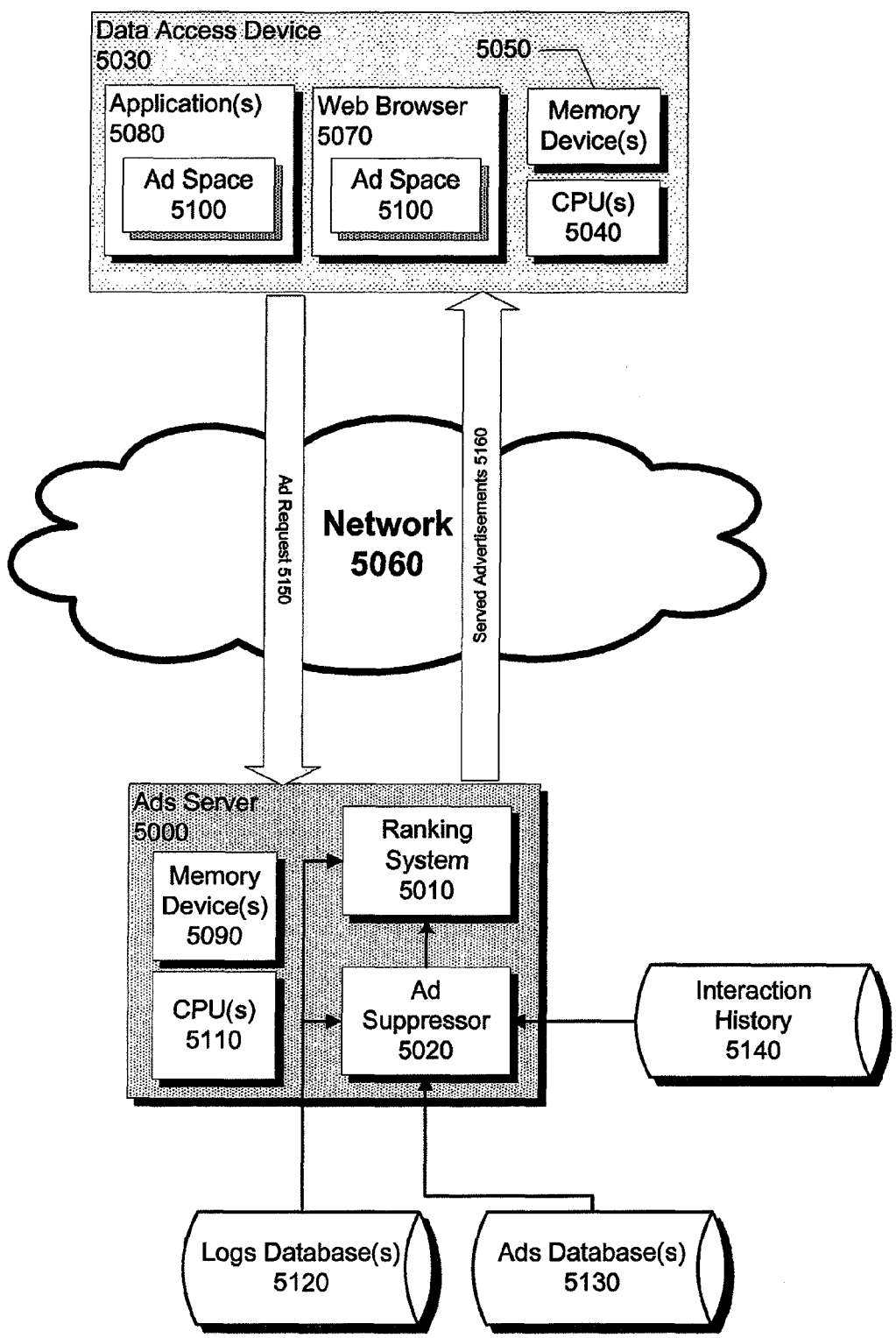
FIG. 6 depicts a block diagram of an embodiment of an ad selection suppression and ranking system as discussed herein.

FIG. 6 depicts a block diagram of an embodiment of an ad serving system that employs an ad suppression utility in addition to a general ad ranking system. In the embodiment shown, a data access device 5030 communicates with an ads server 5000 over a network 5060. Embodiments of a data access device 5030 may include a mobile device such as a cellular phone, personal digital assistant, smart-phone, GPS device, tablet, media player or presentation device, netbook and/or notebook computer, or other portable or semi-portable computing and/or data access and presentation device. Other embodiments of a data access device 5030 may include desktop or fixed location computing and/or media access devices, information kiosks, and virtual devices such as software applications, media access programs, and/or web browsing tools as well as any other variations previously discussed in this document.

Embodiments of a data access device 5030 may include one or more memory devices 5050 for information storage and one or more processors 5040 for data processing. The memory devices(s) 5050 and processor(s) 5040 may operate in concert to run one or more applications 5080 such as data exchange, media display, information search, social network, game and/or GPS/location programs. In some variations, one or more of these applications 5080 may be equipped with ad space 5100 for the display and/or presentation of ads 5160 transmitted via the network 5060 to the data access device 5030 from one or more ad servers 5000. The memory 5050 and processor 5040 may also operate in concert to run one or more web browsing applications or services 5070. Embodiments of a web browser may include application- or app-based browsers or a built-in web browsing tool included in an operating system. Embodiments of a web browser 5070 may also be equipped with ad space 5100 for the display and/or presentation of ads 5160 transmitted via the network 5060 to the data access device 5030 from one or more ad servers 5000.

Embodiments of a network 5060 may include public, private, cellular, telephone, radio-frequency, Ethernet, optical, encrypted, open, IP-based, wide-area, local-area, and/or hard-wired data transfer pathways, and/or combinations thereof, suitable for exchange of information between two or more devices connected thereby.

Embodiments of an ads server 5000 may include one or more computing devices or components thereof, which may be configured to operate collectively, independently, or otherwise collaboratively to serve ads 5160 in response to advertisement requests 5150 from a data access device 5100.

Embodiments of an ads server 5000 may include one or more memory devices 5090 for information storage and one or more processors 5110 for data processing. The memory device(s) 5090 and processor(s) 5110 may operate in concert to execute the various functions and aspects and run the associated applications of the ads server. In some variations, an ads server may be equipped with modules, functional units, sub-systems, or programs/applications or portions thereof that perform ad ranking 5020 (and the attendant log database 5120 and ad database 5130 interface features), and, in ad-suppressing variations, ad selection and suppression 5020 (and the attendant logs database 5120, ads database 5130, and ad interaction history database 5140 interface features).

In some variations, the ad ranking system 5010 may be an associated dedicated server connected to or integrated with an ads database. In other variations, an ad ranking tool 5010 may be a program or a functional module of an overall ads server application or applications suite. The selection and suppression aspect 5020 may be configured to access or otherwise interface with an ads database 5130 in order to identify and extract from the ads database 5130 ads relevant to an incoming ad request 5150.

Embodiments of the ad selection and suppression system 5020 may select ads from the ads database(s) 5130 based on keyword relevance, advertiser bid, and/or ad performance data from one or more historical log databases 5120. Variations of the ad performance data may include ad CTR, conversion rate, cost per click, cost per impression, and other relevant factors indicating ad popularity and effectiveness.

Embodiments of an ad selection and suppression system 5020 may include an ad interaction history analysis feature that analyzes each extracted advertisement based on its historical performance data relative to an originator of the ad request 5150 or a parameter associated therewith (such as a vertical, geo-temporal data, and/or originating device type). An ad suppression decision may then be made based on that analysis, with the non-suppressed ads being forwarded to the ranking system.

Variations of an ad suppressor 5020 operate on the initially selected ads based on ad performance and user/device behavior/preference data compiled from various historical log databases 5120 and also from an interaction history 5140. In some variations, an interaction history 5140 may be part of the overall logs 5120. In other variations, it may be an independent database or set of tables that is logically and/or physically distinct from other logs databases 5120. Variations of an interaction history 5140 may include information about the recent actions of a device or device user with respect to certain types of interactive ads (such as click-to-call, click-to-chat, fillable form, expandable, etc.). The interaction history 5140 may include general aggregate information about types of ad interactions, specific information about individual ad interactions, and/or combinations thereof. In some variations, the interaction history 5140 may also include specific, recently interacted-with ads for a particular user, device, profile and/or account. In further variations, aggregate information may include information about verticals, demographics, and/or geo-temporal factors associated with prior or ongoing ad interaction levels for one or more interactive ad types.

Embodiments of the ad suppressor 5020 may be configured to specifically request, identify, and operate on one or more ad performance indicators (CTR, conversion rate, etc.) related to ads of one or more interaction types (i.e. click-to-call, click-to-chat, click-to-order, etc.) based on the interaction history 5140 data for a given user, device, account, and/or profile. In some embodiments, interactive type ads that are indicated in the interaction history 5140 as having been recently interacted with by the particular device, user, profile, and/or account may be suppressed so that they are not displayed again too soon after the interaction. In other embodiments, ads of a particular interaction type that is determined, from the interaction history 5140, as an unlikely or disliked interaction type may be suppressed from ranking for presentation. In embodiments where the ad interaction type is also a conversion indicator (i.e. click-to-call for a paid service such as an entertainment or technical support line), the ad suppressor 5020 may be configured to suppress such ads even more aggressively for users and/or devices showing a low likely/historical conversion rate.

Embodiments of a ranking system 5010 may include a ranking feature that ranks the forwarded advertisements according to one or more ranking schemes such as auctions, joint-ranking models, and/or other ranking schemes. Embodiments of a ranking system 5010 may be realized through programs or program modules running on the ad server(s) 5000 and/or through dedicated hardware systems or modules for the express purpose of ranking ads. In some embodiments, the ranking system may be functionally intertwined with ad suppressor 5020 such that both are part of the same program, program portion and/or hardware system or module. In other embodiments, the ranking system 5010 may be distinct from the ad suppressor 5020.

In some embodiments of the ads server, after ranking of the forwarded ads, one or more of the top-ranked ads are served 5160 to the data access device 5030 for display and/or presentation thereon.

Figure 7:
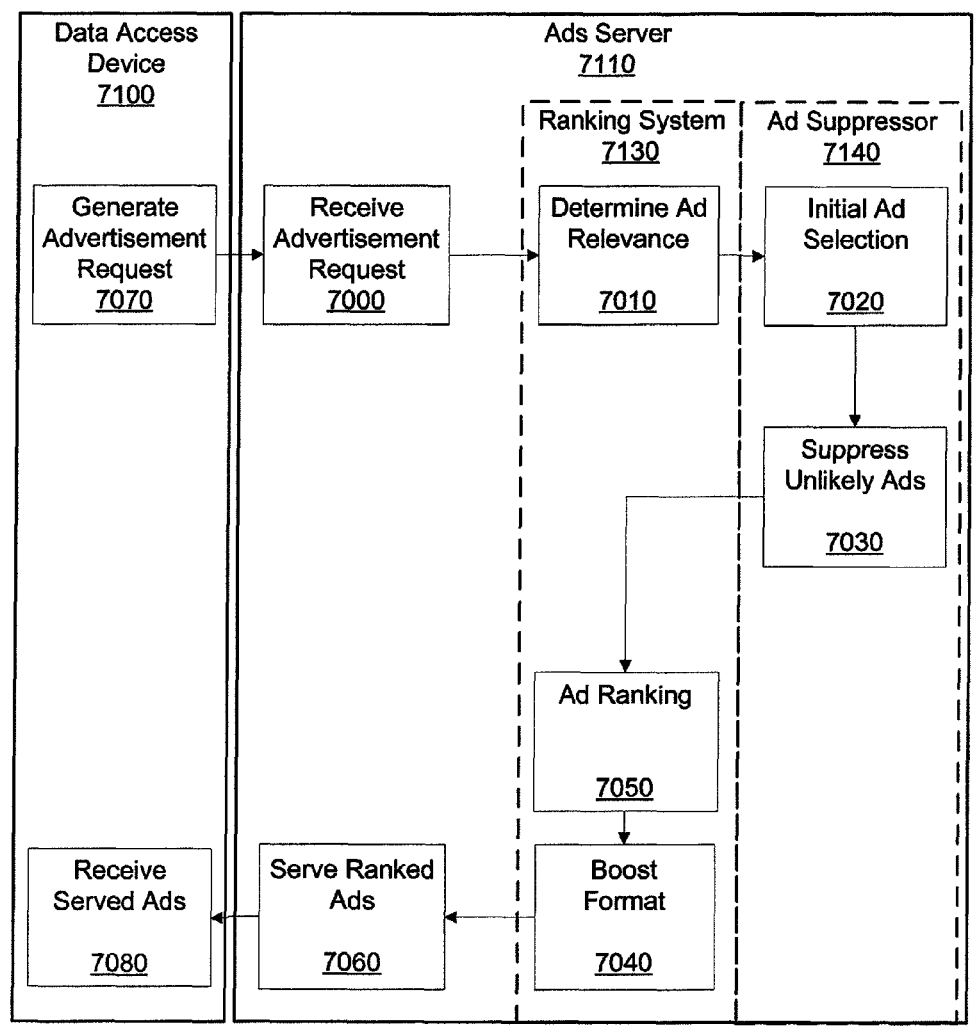
FIG. 7 depicts a block diagram of an embodiment of an ad selection suppression, ranking and format boosting process as discussed herein.

In another variation of a method for improving ad delivery by evaluating and classifying users according to an advertisement interaction type, an ad suppression scheme may be combined with a format boosting utility for a more comprehensive ad selection, ranking, and serving approach that both enhances the ranking of ads a user is likely to interact with, and reduces computational load on the system by suppressing unlikely ads from the ranking process. Such a variation is shown in FIG. 7.

a. In the variation shown, a data access device 7100, may generate an advertisement request 7070 that is received 7000 by an ads server 7110. Variations of a data access device 7070 and ads server 7110 may include any and all of the variations discussed above with respect to format boosting and ad suppressing embodiments.

In the ads server 7110, a variation of a ranking system 7130 may determine ad relevance 7010 based on the received ad request 7000. As discussed above, variations of a ranking system 7130 may be programs, sub-systems, and/or separate computer systems or combinations thereof working as part of, or in concert with the overall ads server 7110.

After making an ad relevance determination 7010, an ad selection and suppression unit 7140 makes an initial selection of ads 7020 based on the relevance determination results. These ads are then operated on by an ad suppression routine 7030 that suppresses ads unlikely to garner response according to one or more of the variations discussed above with respect to ad suppression. The remaining, un-suppressed ads are then passed back to the ad ranking system 7130 for ad ranking 7050 and format boosting 7040 according to one or more of the variations discussed above with respect to ad format rank boosting. The ranked, boosted ads may then be served 7060 to the data access device 7100, which receives the served ads 7080 for subsequent processing and/or presentation.

Only exemplary embodiments of the present invention are shown and described in the present disclosure. It is to be understood that the present invention is capable of use in various other combinations and environments and is capable of changes or modifications within the scope of the inventive concept as expressed herein. It is to be further understood that techniques and methods discussed herein related to operation and configuration of computer systems may be embodied on non-transitory computer-readable media for execution on a computing device or system of computing devices. Such variations are not to be regarded as departure from the spirit and scope of the invention, and all such modifications as would be obvious to one skilled in the art are intended to be included within the scope of the following claims:

The invention claimed is:

1. A system for serving an advertisement of a particular interaction type, the system comprising:
   one or more processors;
   a computer-readable medium coupled to the one or more processors and having instructions stored thereon that, when executed by the one or more processors, cause the one or more processors to perform operations comprising
   receiving, at an ads server, an advertisement request generated by a requesting device;
   determining an interaction type click-through rate (ITCTR) for advertisements of the particular interaction type for the requesting device, the particular interaction type indicating a particular type of user-interaction with the corresponding advertisement via the requesting device;
   generating an interaction type adjustment factor based on the ITCTR to alter one or more initial selection factors for a specific advertisement of the particular interaction type;
   applying the interaction type adjustment factor to the initial selection factors to create adjusted selection factors;
   selecting, from an ads database associated with the ads server, one or more advertisements based on the adjusted selection factors; and
   serving at least one of the selected advertisements to the requesting device with the ads server in response to the advertisement request.

2. The system of claim 1, where the particular interaction type is click-to-call or click-to-chat and the ITCTR includes a number of click-to-call or click-to-chat actions associated with the requesting device over a particular time period before the advertisement request.

3. The system of claim 1, where
   when the ITCTR indicates one or more interactions with ads of the particular interaction type associated with the requesting device within a particular time period prior to the advertisement request, the interaction type adjustment factor is a selection boost factor that boosts a selection likelihood of a specific advertisement of the particular interaction type such that the operation of applying the interaction type adjustment factor gives the specific advertisement a higher likelihood of being selected and served; and
   when the determined ITCTR indicates one or more interactions with the specific advertisement of the particular interaction type associated with the requesting device within a particular time period prior to the advertisement request, the interaction type adjustment factor further includes a suppression factor to suppress the selection of the specific advertisement such that the operation of applying the interaction type adjustment factor gives the specific advertisement a reduced likelihood of being selected and served.

4. The system of claim 1, where the interaction type adjustment factor combines a click-through rate (CTR) for ads of the particular interaction type with the ITCTR.

5. The system of claim 1, where the ITCTR includes a number of particular interaction type advertisement interactions associated with the requesting device over a particular time period prior to the advertisement request.

6. The system of claim 1, the operation of determining an ITCTR further including determining a particular interactor associated with particular advertisement interactions based on inputs from the requesting device with respect to the advertisement request.

7. The system of claim 6, where the inputs from the requesting device are search terms provided by the interactor and where the search terms provided by the interactor are similar to previously entered search terms indicated in an advertisement interaction history as previously triggering presentation of an advertisement of the particular interaction type to the interactor.

8. The system of claim 1, where the operation of selecting advertisements includes selecting relevant advertisements according to one or more relevancy thresholds determined from the advertisement request.

9. The system of claim 1, the operation of determining the ITCTR includes determining an ITCTR for a specific advertisement of the particular interaction type for the requesting device based on an overall click-through rate (CTR) of the advertisement and at least two of the following adjustment indicators: number of particular interaction type advertisement interactions associated with the requesting device or a user thereof in a given time period, average length of particular interaction type advertisement interactions associated with the requesting device or a user thereof in a given time period, and average particular interaction type advertisement rating associated with the requesting device or a user thereof in a given time period, such that the ITCTR for a specific advertisement of the particular interaction type for the requesting device is calculated by adjusting the overall CTR for that particular interaction type according to one or more of the adjustment indicators.

10. The system of claim 8, the operation of selecting including ranking the selected relevant advertisements into a rank order, where each advertisement in the rank order has a rank value;

the operation of serving including serving one or more top-ranked advertisements according to the rank order.

11. The system of claim 10, the operation of generating an interaction type adjustment factor step further including:

generating a ranking adjustment factor having a value of 1 for each selected relevant advertisement; and applying the interaction type adjustment factor to the ranking adjustment factor of an advertisement of the particular interaction type; and where the operation of ranking further includes ranking the selected relevant advertisements into a first rank order based on metrics and parameters associated with one or more advertisements or the advertisement request; and multiplying rank values of the advertisements within the first rank order by the ranking adjustment factor after the operation of applying to create a serving rank order; and where the operation of serving includes serving one or more top-ranked advertisements according to the serving rank order.

12. The system of claim 3, where the one or more interactions with ads of the particular interaction type associated with the requesting device within a particular time period prior to the advertisement request are previous interactions of a minimum threshold duration.

13. A method of serving an advertisement of a particular interaction type to a requesting device, the method comprising:

receiving an advertisement request generated by a requesting device;

selecting an initial set of relevant advertisements based on the advertisement request;

determining an interaction type click-through rate (ITCTR) for each advertisement in the initial set of the particular interaction type for the requesting device, the particular interaction type indicating a particular type of user-interaction with the corresponding advertisement via the requesting device;

determining whether an advertisement of the particular interaction type from the initial set should be suppressed from serving based on the ITCTR for that advertisement;

removing those advertisements indicated for suppression from the initial set to create a reduced set of relevant advertisements;

selecting one or more advertisements from the reduced set according to one or more selection factors; and serving the selected one or more advertisements in response to the advertisement request.

14. The method of claim 13, the step of selecting including ranking the reduced set of advertisements into a rank order, where each advertisement in the rank order has a rank value; and the step of serving including serving one or more top-ranked advertisements according to the rank order.

15. A method of serving an advertisement of a particular interaction type, the method comprising:

receiving an advertisement request generated by a requesting device;

selecting an initial set relevant advertisements based on the advertisement request;

determining an interaction type click-through rate (ITCTR) for each advertisement in the initial set of the particular interaction type for the requesting device, the particular interaction type indicating a particular type of user-interaction with the corresponding advertisement via the requesting device;

determining whether a an advertisement of the particular interaction type from the initial set should be suppressed from serving based on the determined ITCTR for that advertisement;

removing those advertisements indicated for suppression from the initial set to create a reduced set of relevant advertisements;

generating an interaction type adjustment factor for at least one advertisement of the particular interaction type in the reduced set based on the determined ITCTR, where the step of generating includes generating a boost factor to increase a likelihood of selection of the advertisement of the particular interaction type;

selecting at least one advertisement from the reduced set, where selecting includes applying the generated boost factor to the advertisements in the reduced set; and serving the one or more selected advertisements in response to the advertisement request.

16. The method of claim 15, the step of selecting including ranking the reduced set of advertisements into a rank order, where each advertisement in the rank order has a rank value, the step of ranking including applying the generated boost factor to the rank values of the advertisements; and the step of serving including serving one or more top-ranked advertisements according to the rank order.

17. The method of claim 15, where the ITCTR includes an average rating of an advertisement or advertisement interaction type.

18. A method for serving an advertisement of a particular interaction type to a requesting device, wherein the particular interaction type of the advertisement indicates a particular type of user-interaction with the corresponding advertisement via the requesting device, the method comprising:

receiving, at an ads server, an advertisement request generated by the requesting device;

selecting relevant advertisements, from an ads database associated with the ads server, based on the advertisement request;

ranking the selected advertisements into a first rank order, where each advertisement in the first rank order has a rank value;

determining an interaction type click-through rate (ITCTR) for advertisements of the particular interaction type for the requesting device;

generating an interaction type ranking adjustment factor for at least one of the ranked advertisements of the particular interaction type based on the ITCTR to alter the ranking value of a specific advertisement of the particular interaction type within the first rank order;

aggregating the first ranked advertisements into a second rank order by applying the generated interaction type ranking adjustment factor to the rank values of the advertisements within the first rank order; and serving one or more top-ranked advertisements to the requesting device with the ads server according to the second rank order in response to the advertisement request.

19. The method of claim 18, where the particular interaction type is click-to-call or click-to-chat and the ITCTR includes a number of click-to-call or click-to-chat actions associated with the requesting device over a particular time period before the advertisement request.

20. A non-transitory computer-readable medium having embodied thereon instructions which, when executed by one or more processors, cause the one or more processors to perform a method of serving an advertisement of a particular interaction type to a requesting device, the method comprising:

receiving an advertisement request generated by a requesting device;

selecting an initial set of relevant advertisements based on the advertisement request;

determining an interaction type click-through rate (ITCTR) for each advertisement in the initial set of the particular interaction type for the requesting device, the particular interaction type indicating a particular type of user-interaction with the corresponding advertisement via the requesting device;

determining whether an advertisement of the particular interaction type from the initial set should be suppressed from serving based on the ITCTR for that advertisement;

removing those advertisements indicated for suppression from the initial set to create a reduced set of relevant advertisements;

selecting one or more advertisements from the reduced set according to one or more selection factors; and serving the selected one or more advertisements in response to the advertisement request.

21. A non-transitory computer-readable medium having embodied thereon instructions which, when executed by one or more processors, cause the one or more processors to perform a method of serving an advertisement of a particular interaction type, the method comprising:

receiving an advertisement request generated by a requesting device;

selecting an initial set relevant advertisements based on the advertisement request;

determining an interaction type click-through rate (ITCTR) for each advertisement in the initial set of the particular interaction type for the requesting device, the particular interaction type indicating a particular type of user-interaction with the corresponding advertisement via the requesting device;

determining whether a an advertisement of the particular interaction type from the initial set should be suppressed from serving based on the determined ITCTR for that advertisement;

removing those advertisements indicated for suppression from the initial set to create a reduced set of relevant advertisements;

generating an interaction type adjustment factor for at least one advertisement of the particular interaction type in the reduced set based on the determined ITCTR, where the step of generating includes generating a boost factor to increase a likelihood of selection of the advertisement of the particular interaction type;

selecting at least one advertisement from the reduced set, where selecting includes applying the generated boost factor to the advertisements in the reduced set; and serving the one or more selected advertisements in response to the advertisement request.

22. A non-transitory computer-readable medium having embodied thereon instructions which, when executed by one or more processors, cause the one or more processors to perform a method for serving an advertisement of a particular interaction type to a requesting device, wherein the particular interaction type of the advertisement indicates a particular type of user-interaction with the corresponding advertisement via the requesting device, the method comprising:

receiving, at an ads server, an advertisement request generated by the requesting device;

selecting relevant advertisements, from an ads database associated with the ads server, based on the advertisement request;

ranking the selected advertisements into a first rank order, where each advertisement in the first rank order has a rank value;

determining an interaction type click-through rate (ITCTR) for advertisements of the particular interaction type for the requesting device;

generating an interaction type ranking adjustment factor for at least one of the ranked advertisements of the particular interaction type based on the ITCTR to alter the ranking value of a specific advertisement of the particular interaction type within the first rank order;

aggregating the first ranked advertisements into a second rank order by applying the generated interaction type ranking adjustment factor to the rank values of the advertisements within the first rank order; and serving one or more top-ranked advertisements to the requesting device with the ads server according to the second rank order in response to the advertisement request.

* * * * *